United States Patent
Kim et al.

(10) Patent No.: US 8,592,087 B2
(45) Date of Patent: Nov. 26, 2013

(54) NEGATIVE ACTIVE MATERIAL, ELECTRODE INCLUDING THE SAME, AND LITHIUM BATTERY INCLUDING ELECTRODE

(75) Inventors: Deok-Hyun Kim, Yongin-Si (KR); Jae-Myung Kim, Yongin-si (KR); Kyu-Nam Joo, Yongin-si (KR); So-Ra Lee, Yongin-Si (KR); Jong-Hee Lee, Yongin-Si (KR); Young-Su Kim, Yongin-Si (KR); Gu-Hyun Chung, Yongin-Si (KR); Beom-Kwon Kim, Yongin-Si (KR)

(73) Assignee: Samsung SDI, Co., Ltd., Yongin-si, Gyeonggi-do (KR)

( * ) Notice: Subject to any disclaimer, the term of this patent is extended or adjusted under 35 U.S.C. 154(b) by 411 days.

(21) Appl. No.: 12/972,321

(22) Filed: Dec. 17, 2010

(65) Prior Publication Data

US 2011/0305952 A1    Dec. 15, 2011

(30) Foreign Application Priority Data

Jun. 11, 2010   (KR) .................. 10-2010-0055458

(51) Int. Cl.
*H01M 4/13* (2010.01)
(52) U.S. Cl.
USPC ............... 429/231.8; 429/209; 429/231.95; 429/231.1; 429/218.1; 429/232; 252/502; 252/500; 423/445 R; 423/446; 423/448; 423/445 B
(58) Field of Classification Search
USPC .............. 429/232, 231.8, 209, 231.95, 231.1, 429/218.1; 252/502, 500; 423/445 R, 446, 423/448, 445 B
See application file for complete search history.

(56) References Cited

U.S. PATENT DOCUMENTS

| 4,248,909 | A | | 2/1981 | Whittaker |
| 5,716,708 | A | | 2/1998 | Lagow |
| 5,985,446 | A | * | 11/1999 | Lagow ............... 423/445 R |
| 2007/0190413 | A1 | | 8/2007 | Lee et al. |
| 2011/0086294 | A1 | * | 4/2011 | Xiao et al. ............. 429/209 |

FOREIGN PATENT DOCUMENTS

| CN | 1387271 | * 12/2002 |
| JP | 10-512536 A | 12/1998 |
| JP | 2001-278607 A | 10/2001 |
| JP | 2002-262651 A | 9/2002 |
| JP | 2005-085675 A | 3/2005 |
| KR | 10-2001-0068269 A | 7/2001 |

(Continued)

OTHER PUBLICATIONS

Iwama et al., Mechanism of SEI Film Formation on Graphic Carbon Anode in Thermostable Imide Electrotyte, 2005, vol. 8, 5th, No. 1, p. 460.

(Continued)

*Primary Examiner* — Laura Weiner
(74) *Attorney, Agent, or Firm* — Knobbe, Martens, Olson & Bear LLP

(57) ABSTRACT

A negative active material, an electrode including the same, and a lithium battery including the electrode. The negative active material has no volumetric expansion and has high solubility with respect to lithium. In addition, the negative active material is in the form of spherical particles, and thus does not require a separate granulating process. Moreover, the negative active material may enhance the capacity of a lithium battery.

12 Claims, 6 Drawing Sheets

DIAMOND

GRAPHITE

CARBYNE (56) References Cited

FOREIGN PATENT DOCUMENTS

| KR | 10-2002-0051375 A | 6/2002 |
|----|-------------------|--------|
| KR | 10-2004-0098420 A | 11/2004 |
| KR | 10-2005-0013841 A | 2/2005 |
| KR | 10-2005-0032464 A | 4/2005 |
| KR | 10-2007-0088534 A | 8/2007 |
| KR | 10-2009-0028986 A | 3/2009 |
| WO | 00/07936 A1 | 2/2000 |

OTHER PUBLICATIONS

Soshi Shiraishi, "Development of One-dimensional Carbon Allotrope Carbyne-like Carbon Electrode and Investigation on Its Lithium Ion Doping Behavior", Nippon Sheet Glass Foundation for Materials Science and Engineering, 2007, vol. 25, pp. 141-148.

Japanese Office Action dated Nov. 13, 2012 of corresponding Japanese Patent Application No. 2010-285989 which is the parent application—4 pages.

Shiraishi, Soshi, et al., Lithium Ion Doping and Dedoping Behavior of Carbyne-Like Carbon Film Electrode, Chemistry Letters, vol. 34, No. 12, Department of Nano-Material Systems, Graduate School of Engineering, Gunma Univ. Japan, pp. 1678-1683, 2005.

Korean Office Action dated Oct. 18, 2011 of corresponding Korean Patent Application No. 10-2010-0055458—4 pages.

Notice of Allowance dated Dec. 30, 2011 of corresponding Korean Patent Application No. 10-2010-0055458—5 pages.

Scharff P., "New carbon materials for research and technology", Carbon, Oxford, GB, Jan. 1998, vol. 36, No. 5-6, pp. 481-486.

Extended European Search Report dated Oct. 17, 2011 of corresponding European Patent Application No. 11162096.9—6 pages.

* cited by examiner

FIG. 1

DIAMOND  GRAPHITE  CARBYNE

NEGATIVE ACTIVE MATERIAL, ELECTRODE INCLUDING THE SAME, AND LITHIUM BATTERY INCLUDING ELECTRODE

CROSS-REFERENCE TO RELATED APPLICATION

This application claims the benefit of Korean Application No. 10-2010-0055458, filed Jun. 11, 2010 in the Korean Intellectual Property Office, the disclosure of which is incorporated herein by reference.

BACKGROUND

1. Field

One or more embodiments of the present invention relate to a negative active material, an electrode including the same, and a lithium battery including the electrode.

2. Description of the Related Art

Recently, lithium secondary batteries have drawn attention as power sources for small, portable electronic devices. As lithium secondary batteries contain an organic electrolyte solution, they have a discharge voltage that is at least two times that of batteries containing an aqueous alkali electrolyte, and thus lithium secondary batteries have a higher energy density.

As positive materials for lithium secondary batteries, lithium-transition metal oxides, such as $LiCoO_2$, $LiMn_2O_4$, and $LiNi_{1-x-y}CO_xMn_yO_2$ where $0 \leq x \leq 0.5$ and $0 \leq y \leq 0.5$, which have a structure that allows intercalation of lithium ions, are mainly used. Carbonaceous materials in various forms, such as artificial graphite, natural graphite, and hard carbon, which allow intercalation and deintercalation of lithium ions, have been used as negative materials. In order to develop high-capacity and high-output batteries, non-carbonaceous materials, such as silicon (Si), $SiO_x$, or an Si/Sn alloy, have also been intensively studied for use as negative materials.

Such non-carbonaceous materials exhibit a very high capacitance density at least ten times that of graphite. However, due to volumetric expansion and shrinkage of a non-carbonaceous material during charging and discharging of a lithium battery, the cycle lifetime characteristics of the battery may deteriorate. Furthermore, there are difficulties in handling such non-carbonaceous materials during manufacturing processes.

SUMMARY

One or more embodiments of the present invention include a negative active material that does not volumetrically expand and that is capable of enhancing the capacity of a lithium battery.

One or more embodiments include an electrode including the negative active material.

One or more embodiments of the present invention include a lithium battery employing the electrode including the negative active material.

According to one or more embodiments of the present invention, a negative active material includes a carbonaceous material having a linear carbon chain.

According to one or more embodiments of the present invention, an electrode includes the negative active material described above.

According to one or more embodiments of the present invention, a lithium battery includes the electrode including the negative active material described above.

Additional aspects, embodiments and/or advantages of the invention will be set forth in part in the description which follows and, in part, will be obvious from the description, or may be learned by practice of the invention.

BRIEF DESCRIPTION OF THE DRAWINGS

These and/or other aspects, embodiments and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a negative active material, an electrode including the same, and a lithium battery including the electrode will be described in detail. In general, a negative active material of a lithium secondary battery is repeatedly subjected to volumetric expansion and shrinkage due to intercalation and deintercalation of lithium ions caused by repetitive charging and discharging. Because of this cycling, cracks may occur in the negative active material, thereby shortening the life of the negative active material and reducing the electrical conductivity thereof.

Figure 1:
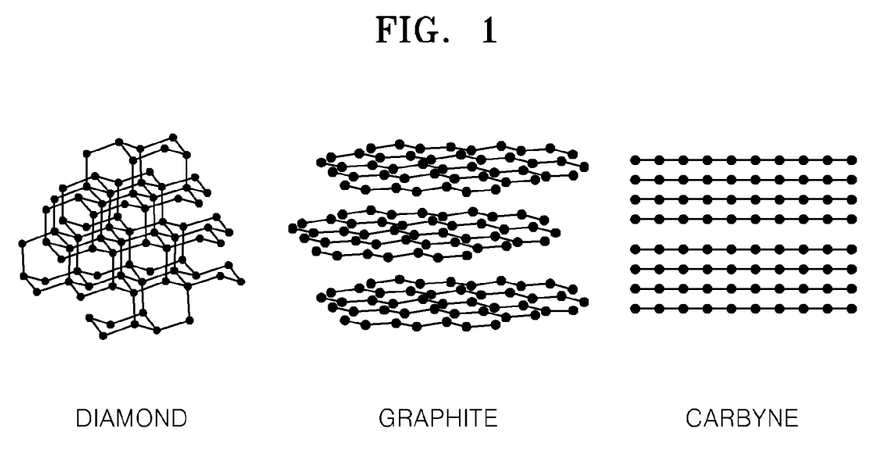
FIG. 1 is a diagram illustrating representative bonding structures of carbon.

Meanwhile, carbon has various chemically stable crystal structures at room temperature. FIG. 1 is a diagram illustrating representative crystal structures of carbon, according to an embodiment of the present invention. Referring to FIG. 1, the representative crystal structures of carbon are diamond with sp3 bonds, graphite with sp2 bonds, and carbyne with sp1 bonds. Carbyne has a 1-dimensional structure of a linear carbon chain in which carbon bonds are in a thread form. In this form it has excellent conductivity and has a Young's modulus 40 times greater than that of diamond. As a result, carbyne receives much attention from the nanotechnology field. However, carbyne has a heat-resistance temperature of about 250° C., and thus it is not widely used since its high-temperature stability is poor.

Since lithium batteries are not operated at a temperature greater than 200° C., when a carbonaceous material having a 1-dimensional structure of a linear carbon chain, such as carbyne, is used as a negative active material of a lithium battery, volumetric expansion of the negative active material barely occurs during charging and discharging of the battery, and the negative active material enhances the capacity of the lithium battery. A negative active material according to an embodiment of the present invention includes a carbonaceous material having a linear carbon chain. In this regard, the linear carbon chain has a 1-dimensional structure with sp1 bonds, and for example, the carbonaceous material having such bonding structure may be carbyne.

The carbonaceous material having a linear carbon chain may be prepared by stirring a polymer such as polyvinylidene fluoride (PVdF), polyvinyl chloride (PVC), polyethylene (PE) or polypropylene (PP) in a basic solvent. Since the carbonaceous material has a linear chain crystal structure, there is a much higher possibility of binding between lithium and carbon in a lithium battery than when using graphite, and compared to graphite, the carbonaceous material has more sites where intercalation and deintercalation of lithium ions occur during charging and discharging. Thus, this linear chain carbonaceous material has a much higher theoretical capacity than that of graphite.

In addition, the linear chain carbonaceous material is in the form of almost completely spherical particles, and thus it needs not to be subjected to a conventional granulating process. Moreover, when the linear chain carbonaceous material is used to prepare an electrode, the packing density of the carbonaceous material is enhanced, and pathways of intercalation of Li ions are more various than those in graphite. Thus, a lithium battery including the electrode prepared using the linear chain carbonaceous material may be charged and discharged at a high speed. Accordingly, the linear chain carbonaceous material may increase the capacity of a lithium battery. For example, the round particles may have an average particle diameter in the range of about 20 to about 50 μm, and when the average particle diameter thereof is within this range, the linear chain carbonaceous material may exhibit high packing density and excellent capacity characteristics.

In addition, the linear chain carbonaceous material has a porous structure having a plurality of nano-sized pores, and the pores may be in various irregular forms. Such irregular porous structure of the linear chain carbonaceous material facilitates intercalation and deintercalation of lithium ions. In addition, the contact area between the negative active material and the electrolyte highly increases, and thus the electric capacity per unit mass of the negative active material increases, the pathway for electron transfer from inside the negative active material to the electrolyte decreases, the pathway for lithium ion transfer also decreases, and thus the speed of the electrode reaction may increase.

As described above, the negative active material according to the present embodiment includes a carbonaceous material having a 1-dimensional crystal structure of a linear carbon chain, whereby variability in volume due to charging and discharging is suppressed, and high capacity and long lifetime may be obtained. In addition, the linear chain carbonaceous material has high electrical conductivity, and thus a separate conductive material is not needed and battery capacity may be expected to be enhanced further.

When the carbonaceous material is used as a negative active material for a lithium battery, the linear chain carbonaceous material may be used alone or in a combination with other negative active materials that are commonly used in the art. In addition, the linear chain carbonaceous material may be coated on a surface of another negative active material.

The negative active material may further include a negative active material that is commonly used in the art as a negative electrode material. Examples of the commonly used negative active material include lithium metal, a metal alloyable with lithium, a transition metal oxide, a material that allows doping or undoping of lithium, a material that allows reversible intercalation and deintercalation of lithium ions, and the like.

Examples of the metal alloyable with lithium include aluminum (Al), silicon (Si), tin (Sn), lead (Pb), zinc (Zn), bismuth (Bi), indium (In), magnesium (Mg), gallium (Ga), cadmium (Cd), silver (Ag), germanium (Ge), potassium (K), sodium (Na), calcium (Ca), strontium (Sr), barium (Ba), antimony (Sb), zinc (Zn), and titanium (Ti).

Examples of the transition metal oxide include a tungsten oxide, a molybdenum oxide, a titanium oxide, a lithium titanium oxide, a vanadium oxide, a lithium vanadium oxide, and the like. Examples of the material that allows doping or undoping of lithium include silicon (Si), $SiO_x$ where $0<x<2$, an Si-T alloy wherein T is an alkali metal, an alkali earth metal, a Group XIII element, a Group XIV element, a transition metal, a rare earth element, or combinations thereof (except for Si), Sn, $SnO_2$, an Sn-T alloy wherein T is an alkali metal, an alkali earth metal, a Group XIII element, a Group XIV element, a transition metal, a rare earth element, or a combination thereof (except for Sn), and combinations of at least one of these materials and SiO2. T may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material that allows reversible intercalation and deintercalation of lithium ions may be any carbonaceous negative active material that is commonly used in a lithium battery. Examples of such carbonaceous materials may include crystalline carbon, amorphous carbon, and mixtures thereof. Examples of the crystalline carbon include natural graphite and artificial graphite that is in amorphous, plate, flake, spherical, or fibrous form. Examples of the amorphous carbon include soft carbon (carbon sintered at low temperatures), hard carbon, meso-phase pitch carbides, sintered cokes, and the like.

The amount of the negative electrode material may be in the range of about 0.5 to about 30 wt % based on the total weight of the negative active material depending on the characteristics of a battery.

An electrode according to another embodiment of the present invention includes the negative active material. The electrode may be a negative electrode, for example, a negative electrode of a lithium battery. The negative electrode may be prepared by adding the negative active material described above, a binder, and an optional conductive material to a solvent and mixing the solution to prepare a negative active material composition, and then forming the negative active material composition into a certain shape, or coating a current collector such as a copper foil with the negative active material composition.

The binder included in the negative active material composition is a component assisting in binding between the negative active material and the conductive material, and in binding of the negative active material to the current collector, and the amount of the binder may be in the range of about 1 to about 50 parts by weight based on 100 parts by weight of the total weight of the negative active material. Examples of the binder include polyvinylidene fluoride (PVdF), polyvinyl alcohols, carboxymethyl cellulose (CMC), starch, hydroxypropyl cellulose, regenerated cellulose, polyvinylpyrrolidone, tetrafluoroethylene, polyethylene (PE), polypropylene (PP), ethylene-propylene-diene terpolymer (EPDM), sulfonated EPDM, styrene butadiene rubber, fluoro rubber, and various copolymers.

The conductive material is not particularly limited, and may be any conductive material as long as it has a suitable conductivity without causing chemical changes in the fabricated battery. Examples of the conductive material include graphite such as natural or artificial graphite; carbon blacks such as acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The amount of the conductive material may be in the range of about 2 to about 5 parts by weight based on 100 parts by weight of the negative active material. When the amount of the conductive material is within this range, the obtained electrode has high conductivity.

Examples of the solvent include N-methylpyrrolidone (NMP), acetone, water, and the like. The amount of the solvent may be in the range of about 1 to about 10 parts by weight based on 100 parts by weight of the negative active material. When the amount of the solvent is within this range, a process for forming a negative active material layer is easily performed.

In addition, the current collector is generally fabricated to have a thickness in the range of about 3 to about 500 µm. The current collector is not particularly limited, and may be any materials as long as it has a suitable conductivity without causing chemical changes in the fabricated battery. Examples of the current collector include copper, stainless steel, aluminum, nickel, titanium, sintered carbon, copper or stainless steel that is surface-treated with carbon, nickel, titanium or silver, and aluminum-cadmium alloys. In addition, the current collector may be processed to have fine irregularities on the surfaces thereof so as to enhance adhesive strength of the current collector to the negative active material, and may be used in any of various forms including films, sheets, foils, nets, porous structures, foams, and non-woven fabrics.

The negative active material composition may be directly coated on a current collector to manufacture a negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may be in any of other forms. Alternatively, the negative active material composition may be printed on a flexible electrode substrate to manufacture a printable battery.

A lithium battery according to another embodiment of the present invention includes the electrode including the negative active material as a negative electrode. The lithium battery may be manufactured in the following manner.

A positive electrode and a negative electrode are fabricated by respectively coating a positive active material composition and a negative active material composition on current collectors and respectively drying the resulting products. First, a negative electrode plate is manufactured using a negative active material composition in the same manner described above. Separately, in order to form the positive electrode, a positive active material, a conductive material, a binder, and a solvent are mixed together to prepare a positive active material composition.

Any lithium-containing metal oxide that is commonly used in the art may be used as the positive active material. Examples of the lithium-containing metal oxide include $LiCoO_2$, $LiMn_xO_{2x}$ where x=1 or 2, $LiNi_{1-x}Mn_xO_2$ where $0<x<1$, and $LiNi_{1-x-y}Co_xMn_yO_2$ where $0 \leq x \leq 0.5$ and $0 \leq y \leq 0.5$. For example, compounds that allow intercalation and deintercalation of lithium ions, such as $LiMn_2O_4$, $LiCoO_2$, $LiNiO_2$, $LiFeO_2$, $V_2O_5$, TiS, MoS, and the like, may be used.

The conductive material, the binder, and the solvent used in the negative active material composition described above may also be used in the positive active material composition. If required, a plasticizer may be added to each of the positive material composition and the negative material composition to form pores inside the electrode plates. In this regard, the amounts of the positive active material, the conductive material, the binder and the solvent may be the same level as those used in a conventional lithium battery.

A positive electrode current collector is fabricated to have a thickness in the range of about 3 to about 500 µm, and may be any current collector so long as it has high conductivity without causing chemical changes in the fabricated battery. Examples of the positive electrode current collector include stainless steel, aluminum, nickel, titanium, sintered carbon, and aluminum or stainless steel that is surface-treated with carbon, nickel, titanium, and silver. The positive electrode current collector is processed to form fine irregularities on the surfaces thereof so as to enhance adhesive strength of the current collector to the positive active material, and may be used in any of various forms including films, sheets, foils, nets, porous structures, foams, and non-woven fabrics.

The positive active material composition is directly coated on the positive electrode current collector and dried to prepare the positive electrode plate. Alternatively, the positive active material composition may be cast on a separate support, and then a positive active material film separated from the support may be laminated on the positive electrode current collector to prepare the positive electrode plate.

The positive electrode and the negative electrode may be separated from each other by a separator. Any separator that is commonly used in lithium batteries may be used. In particular, the separator may have low resistance to migration of ions in an electrolyte and have high electrolyte-retaining ability. Examples of the separator may include glass fiber, polyester, polyethylene, polypropylene, polyfluoropolymer such as polytetrafluoroethylene (PTFE), and combinations thereof, each of which may be a nonwoven fabric or a woven fabric. The separator has a pore diameter in the range of about 0.01 to about 10 µm and a thickness in the range of about 5 to about 300 µm.

A lithium salt-containing non-aqueous electrolyte is composed of a non-aqueous electrolytic solution and lithium. As the non-aqueous electrolyte, a non-aqueous electrolytic solution, an organic solid electrolyte, or an inorganic solid electrolyte may be used.

As the non-aqueous electrolytic solution, any of aprotic organic solvents such as N-methyl-2-pyrrolidone, propylene carbonate, ethylene carbonate (EC), butylene carbonate, dimethyl carbonate, diethyl carbonate (DEC), fluoroethylene carbonate (FEC), γ-butyrolactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used.

Examples of the organic solid electrolyte include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5N_{12}$, $Li_3N$-$LiI$-$LiOH$, $Li_2SiS_3$, $Li_4SiO_4$, $Li_4SiO_4$-$LiI$-$LiOH$, and $Li_3PO_4$—$Li_2S$—$SiS_2$.

The lithium salt may be any lithium salt that is commonly used in a lithium battery, and that is soluble in the above-mentioned lithium salt-containing non-aqueous electrolyte. For example, the lithium salt may include at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic carboxylic acid lithium, and lithium tetraphenyl borate.

Figure 2:
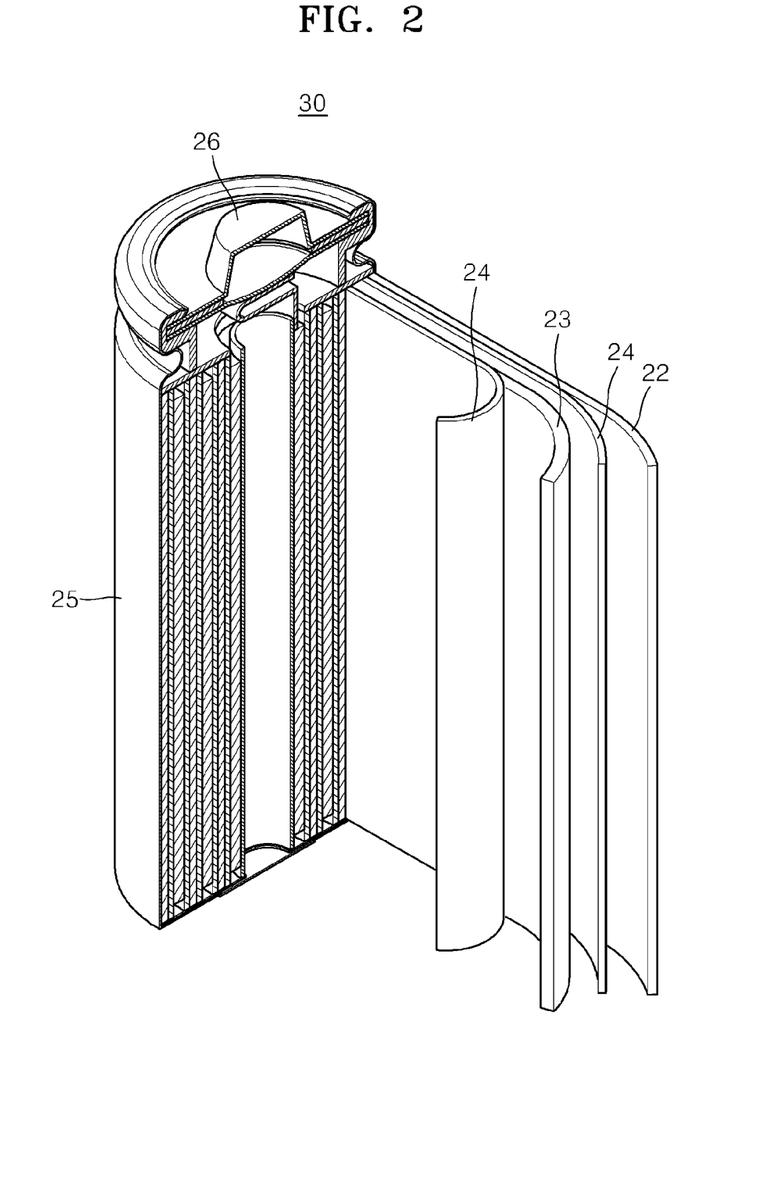
FIG. 2 is a schematic perspective view of a lithium battery according to an embodiment of the present invention.

FIG. 2 is a schematic perspective view of a lithium battery 30 according to an embodiment of the present invention. Referring to FIG. 2, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25 and the battery case 25 is sealed by a sealing member 26, thereby completing the manufacture of the lithium battery 30. The battery case 25 may have a cylindrical shape, a rectangular shape or a thin-film shape. The lithium battery 30 may be a lithium ion battery.

Lithium batteries may be suitable for use as power sources for electric vehicles and power tools requiring high capacity, high-power output, and operation under high temperature conditions, in addition to power sources for conventional mobile phones and portable computers. Lithium batteries may be coupled to conventional internal combustion engines, fuel cells, or super-capacitors to be used in hybrid vehicles. In addition, lithium batteries may be used in all applications requiring high-power output, high voltage, and operation under high temperature conditions.

Hereinafter, one or more embodiments of the present invention will be described in detail with reference to the following examples. However, these examples are not intended to limit the scope of the one or more embodiments of the present invention.

PREPARATION EXAMPLE 1

Synthesis of Negative Active Material

First, 300 ml of tetrahydrofuran (THF) as a solvent and 30 g of $CH_3OK$ as a base were heated at about 150° C. to prepare a solution in which the base was dissolved in the solvent. Next, 10 g of PVdF were added to the solution, and the resulting mixture was subjected to synthesis reaction while being stirred at about 200° C. for about 3 to 5 hours. After the synthesis reaction had terminated, the solution was filtered, and the remaining reactant was dried at 100° C. to remove the solvent and any organic material. The resulting product was washed with ethanol and distilled water and dried again. In addition, an annealing process was performed on the resulting product at a temperature in the range of about 900 to about 1,000° C. to enhance the crystallinity thereof, thereby completing the synthesis of a negative active material.

PREPARATION EXAMPLES 2-4

Synthesis of Negative Active Material

Negative Active materials were synthesized in the same manner as in Preparation Example 1, except that PVC, PE, and PP were respectively used instead of PVdF.

Figure 3:
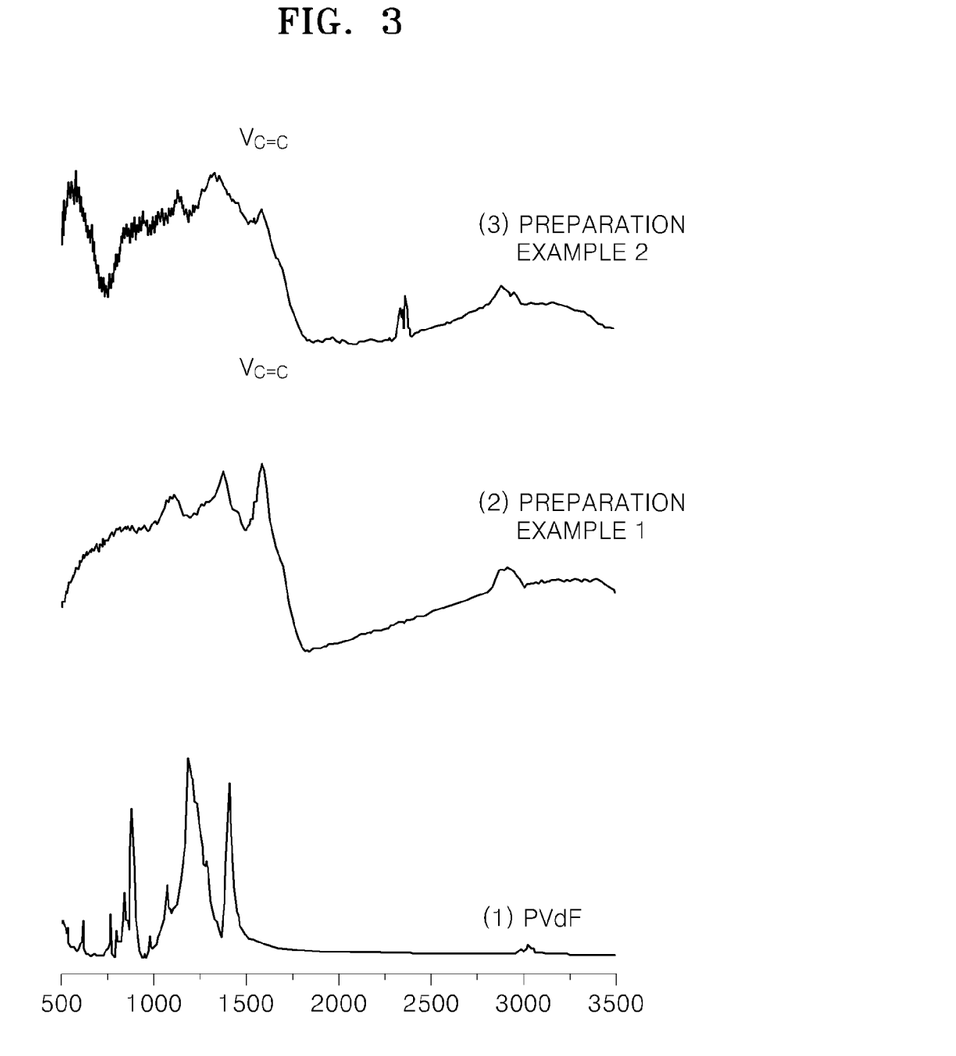
FIG. 3 illustrates graphs showing Fourier-Transform Infrared (FT-IR) spectroscopy results of negative active materials synthesized according to Preparation Examples 1 and 2, and of polyvinylidene fluoride (PVDF) used as a raw material.

Fourier-Transform Infrared (FT-IR) spectroscopy results of the negative active materials prepared according to Preparation Examples 1 and 2 are illustrated in FIG. 3. In FIG. 3, (1) represents FT-IR spectroscopy results of PVdF used as a raw material for synthesis of the negative active material, and (2) and (3) represent FT-IR spectroscopy results of the negative active materials of Preparation Examples 1 and 2, respectively. Referring to FIG. 3, in FT-IR spectroscopy of the negative active materials of Preparation Examples 1 and 2, it is confirmed that C=C and C≡C peaks are present at about 1,600 $cm^{-1}$ and 3,300 $cm^{-1}$, respectively, while the peaks are not present in the case of PVdF as a raw material, and these results show that carbyne was formed. The C=C peak is also present since sp1 hybridized bonds are non-localized, and thus —C≡C— and =C=C= bonds are simultaneously found.

Figure 4:
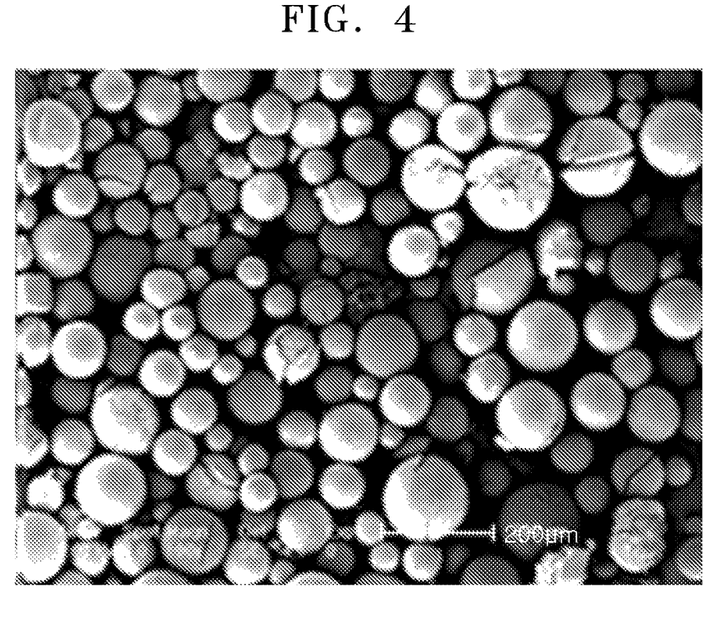
FIGS. 4 to 6 are enlarged scanning electron microscopic (SEM) images of a negative active material prepared according to Preparation Example 1 at magnifications of 100×, 1,000×, and 30,000×, respectively.
Figure 5:
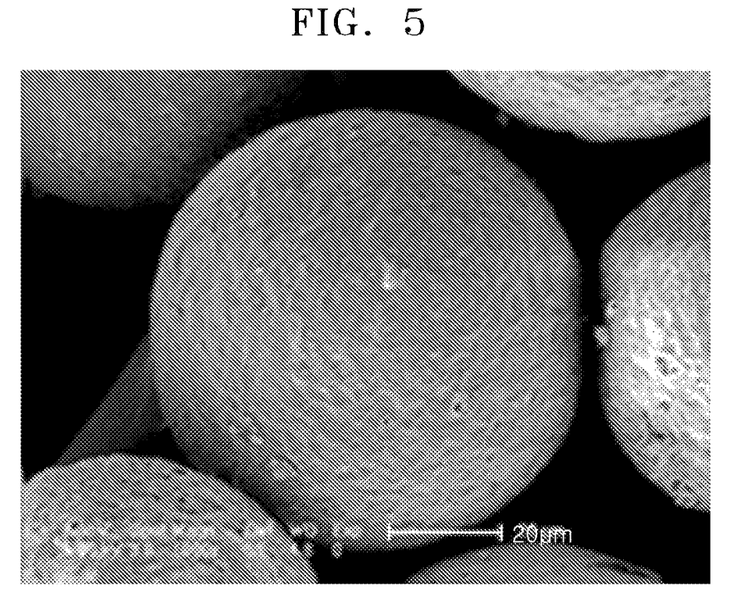
Figure 6:
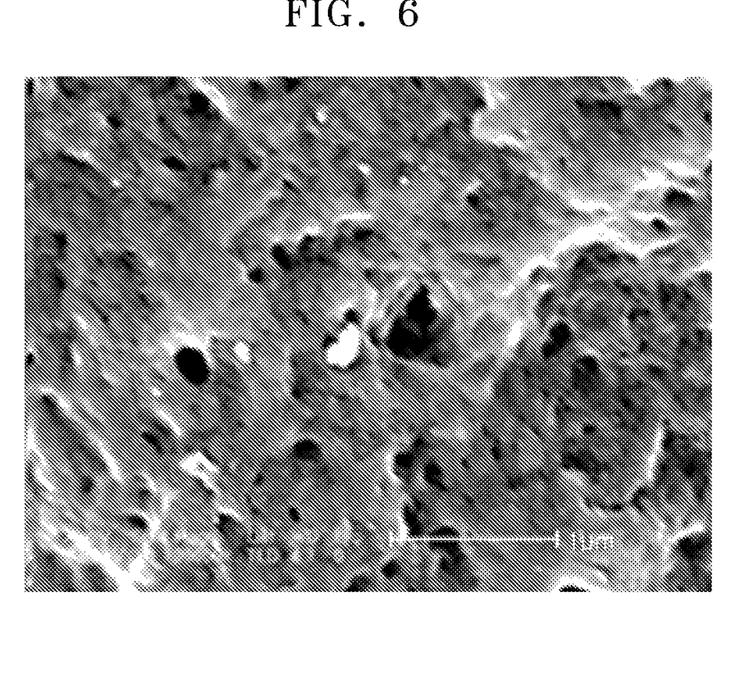

An image of the carbyne synthesized according to Preparation Example 1 was enlarged using a scanning electron microscope (SEM) at magnifications of 100×, 1,000×, and 30,000×, and the SEM images of the carbyne are respectively illustrated in FIGS. 4 to 6. Referring to FIGS. 4 and 5, the carbyne of Preparation Example 1 has an almost completely spherical shape. Referring to FIG. 6, the carbyne of Preparation Example 1 has a porous structure. The porous structure may be particularly useful in facilitating intercalation and deintercalation of lithium ions.

In addition, element distribution states of the carbyne of Preparation Example 1 were observed using energy dispersive X-ray spectroscopy (EDAX), and the results are shown in Table 1 below.

TABLE 1

| Element | Wt % | At % |
|---------|------|------|
| C | 73.37 | 82.18 |
| O | 16.86 | 14.18 |
| F | 0.78 | 0.55 |
| K | 8.99 | 3.09 |

Meanwhile, the EDAX observation results of PVdF as a raw material are shown in Table 2 below.

TABLE 2

| Element | Wt % | At % |
|---------|------|------|
| C | 41.72 | 53.10 |
| F | 58.28 | 46.90 |

Referring to Tables 1 and 2, it is confirmed that the negative active material of Preparation Example 1 has an increased amount of carbon due to the synthesis of carbyne, compared with PVdF.

(Fabrication of Electrode and Lithium Battery Using the Electrode)

EXAMPLE 1

5 g of the carbyne prepared according to Preparation Example 1 and 0.35 g of a solution of 5 wt % polyvinylidene fluoride (PVdF, KF1100, Kureha Chemical Industry Corporation, Japan) in N-methylpyrrolidone (NMP) were mixed to prepare a slurry. The slurry was coated on a Cu current collector to a thickness of about 50 μm using a doctor blade. Then, the resultant was dried at room temperature for 2 hours, and then dried again at 120° C. for 2 hours to manufacture a negative electrode plate.

The negative electrode plate, lithium metal as a counter electrode, Star 20 (polypropylene film) as a separator, and an electrolytic solution obtained by dissolving 1.5 M of $LiPF_6$ in a mixture of ethylene carbonate (EC), diethyl carbonate (DEC) and fluoroethylene carbonate (FEC) in a mixing ratio of 5:70:25 (a volume ratio) were used to manufacture a standard dimension coin cell.

EXAMPLE 2

A coin cell was manufactured in the same manner as in Example 1, except that the carbyne prepared according to Preparation Example 2 was used instead of the carbyne of Preparation Example 1.

EXAMPLE 3

A coin cell was manufactured in the same manner as in Example 1, except that 2.5 g of graphite (SFG6, TimCal) was used together with 2.5 g of the carbyne of Preparation Example 1.

COMPARATIVE EXAMPLE 1

A coin cell was manufactured in the same manner as in Example 1, except that only 5 g of graphite (SFG6, TimCal) was used as a negative active material instead of the carbyne.

EVALUATION EXAMPLE 1

Charge-Discharge Test

Figure 7:
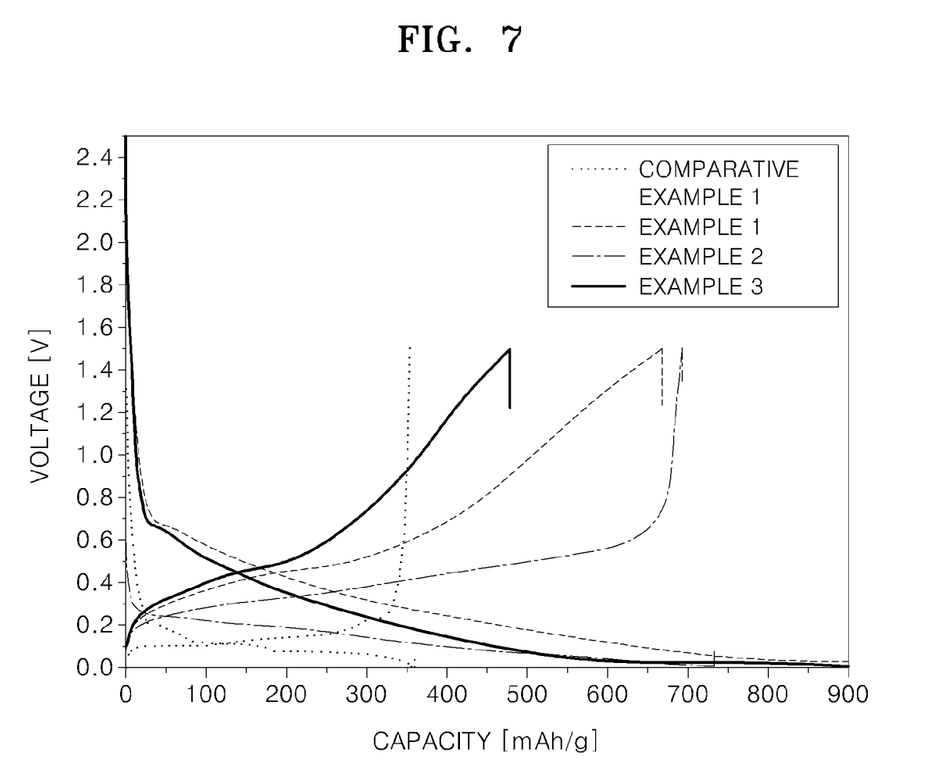
FIG. 7 is a graph showing charge-discharge test results of lithium batteries manufactured according to Examples 1 to 3 and Comparative Example 1.

The lithium batteries manufactured according to Examples 1 to 3 and Comparative Example 1 were charged by flowing a current of about 10 to about 20 mA per 1 g of the negative active material until the voltage thereof reached 0.001 V (with respect to Li) and then discharged at the same current flow rate until the voltage reached 1.5 V (with respect to Li). Then, the cycles of charging and discharging were repeated 50 times at the same current flow rate and the same voltage. The results from the first cycles of charging and discharging are shown in FIG. 7. The capacity retention rate was calculated using Equation 1 below. The capacity retention rates of the lithium batteries of Examples 1 to 3 and Comparative Example 1 are shown in Table 3 below.

Capacity retention rate (%)=Discharge capacity at 50th cycle/Discharge capacity at 2nd cycle    Equation 1

TABLE 3

| | Initial discharge capacity (mAh/g) | Initial efficiency (%) | Capacity retention rate (%) @ 50 cycles |
|---|---|---|---|
| Example 1 | 670 | 70 | 90 |
| Example 2 | 695 | 95 | 92 |
| Example 3 | 480 | 60 | 93 |
| Comparative Example 1 | 350 | 95 | 98 |

Referring to FIG. 7 and Table 3, the lithium battery of Comparative Example 1 has a discharge capacity of about 350 mAh/g at 1.5 V, while the lithium batteries of Examples 1 and 2 have discharge capacities of about 670 mAh/g and 695 mAh/g, respectively at 1.5 V. The discharge capacities of the lithium batteries of Examples 1 and 2 were almost twice as large as the discharge capacity of the lithium battery of Comparative Example 1.

The lithium battery of Example 3 including both carbyne and graphite as the negative active material also exhibited excellent discharge capacity. From the results, it is assumed that various results may be obtained depending on the ratios of carbyne and graphite in a mixed state of carbyne and graphite.

As described above, according to the one or more above embodiments of the present invention, a negative active material has no volumetric expansion and has high solubility with respect to lithium, compared with a conventional negative active material. In addition, the negative active material is in the form of round particles, and thus does not require a separate granulating process, resulting in a reduction in manufacturing costs. The negative active material may be employed in a negative electrode of a lithium battery, thereby facilitating packing processes of the lithium battery and enhancing the capacity of the lithium battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative electrode for a secondary battery comprising:
a negative active material comprising a carbonaceous material having a 1-dimensional linear carbon chain with sp1 bonds,
wherein the carbonaceous material is in the form of spherical particles.

2. The negative electrode of claim 1, wherein the carbonaceous material comprises carbyne.

3. The negative electrode of claim 1, wherein an average particle diameter of the spherical particles is in a range of about 20 to about 50 μm.

4. The negative electrode of claim 1, wherein the carbonaceous material has a porous structure.

5. The negative electrode of claim 1, wherein the negative active material further comprises at least one additional material selected from the group consisting of lithium metal, a metal alloyable with lithium, a transition metal oxide, a material that allows doping or undoping of lithium, and a material that allows reversible intercalation and deintercalation of lithium ions.

6. The negative electrode of claim 5, wherein the amount of the at least one additional material is about 0.5 to about 30 percent by weight of the total weight of the negative material.

7. The negative electrode of claim 5, wherein the metal alloyable with lithium comprises aluminum (Al), silicon (Si), tin (Sn), lead (Pb), zinc (Zn), bismuth (Bi), indium (In), magnesium (Mg), gallium (Ga), cadmium (Cd), silver (Ag), germanium (Ge), potassium (K), sodium (Na), calcium (Ca), strontium (Sr), barium (Ba), antimony (Sb), zinc (Zn), or titanium (Ti).

8. The negative electrode of claim 5, wherein the material that allows reversible intercalation and deintercalation of lithium ions is a carbonaceous negative active material.

9. A lithium battery comprising an electrode comprising the negative active material of claim 1.

10. A lithium battery comprising:
a negative electrode including a negative active material comprising a carbonaceo us material, the carbonaceous material having a 1-dimensional linear carbon chain wherein the carbonaceous material is in the form of spherical particles; a positive electrode;
a separator disposed between the negative electrode and the positive electrode;
an electrolyte; and
a case.

11. A negative electrode comprising:
a negative active material comprising a carbonaceous material having a linear carbon chain; and
the negative active material further comprising a transition metal oxide selected from the group consisting of a tungsten oxide, a molybdenum oxide, a titanium oxide, a lithium titanium oxide, a vanadium oxide, and a lithium vanadium oxide.

12. A negative electrode comprising:
a negative active material comprising a carbonaceous material having a linear carbon chain; and
the negative active material further comprising a material that allows doping or undoping of lithium selected from the group consisting of silicon (Si), $SiO_x$ where $0<x<$, a silicon alloy and a tin alloy.

* * * * *

UNITED STATES PATENT AND TRADEMARK OFFICE
CERTIFICATE OF CORRECTION

PATENT NO. : 8,592,087 B2
APPLICATION NO. : 12/972321
DATED : November 26, 2013
INVENTOR(S) : Deok-Hyun Kim et al.

Page 1 of 1

It is certified that error appears in the above-identified patent and that said Letters Patent is hereby corrected as shown below:

On the title page col. 2, line 2, item (56), under "Other Publications," please change "Electrotyte," to --Electrolyte,--.

In the Specification:

At Col. 1, line 30, please change "$LiNi_{1-x-y}CO_xMn_yO_2$" to --$LiNi_{1-x-y}Co_xMn_yO_2$--.

At Col. 4, line 21, please change "$SiO2$." to --$SiO_2$.--.

At Col. 5, lines 3-4, please change "polyvinylpyrollidone," to --polyvinylpyrrolidone,--.

At Col. 6, line 9, please change "$LiNi_{1-x-y}CO_xMn_yO_2$" to --$LiNi_{1-x-y}Co_xMn_yO_2$--.

In the Claims:

At Col. 10, line 36, please change "sp1bonds," to --sp1 bonds,--.

At Col. 11, line 3, please change "carbonaceo us" to --carbonaceous--.

At Col. 11, line 4, after "chain" please insert --with sp1 bonds,--.

At Col. 11, line 24, please change "0<x<," to --0<x<2,--.

Signed and Sealed this
First Day of July, 2014

Michelle K. Lee
*Deputy Director of the United States Patent and Trademark Office*